United States Patent

[11] 3,597,891

[72] Inventor Flyodd A. Martin
 Fountain Valley, Calif.
[21] Appl. No. 863,239
[22] Filed Oct. 2, 1969
[45] Patented Aug. 10, 1971
[73] Assignee McDonnell Douglas Corporation

[54] INTERIOR ABSORPTIVE PANEL
 3 Claims, 3 Drawing Figs.
[52] U.S. Cl. .................................................. 52/145,
 52/618
[51] Int. Cl. ..................................................... E04b 1/82,
 E04c 2/32
[50] Field of Search .......................................... 52/144,
 145, 613, 615, 618, 624, 625

[56] References Cited
 UNITED STATES PATENTS
| | | | |
|---|---|---|---|
| 1,961,374 | 6/1934 | Mazer | 52/144 |
| 3,013,641 | 12/1961 | Compton | 52/615 |
| 3,231,454 | 1/1966 | Williams | 161/68 |
| 3,430,405 | 3/1969 | Alder et al. | 52/615 |

FOREIGN PATENTS
| | | | |
|---|---|---|---|
| 151,474 | 5/1953 | Australia | 52/618 |
| 424,620 | 5/1933 | Great Britain | 52/618 |
| 1,024,889 | 1/1953 | France | 52/618 |
| 1,180,504 | 10/1964 | Germany | 52/615 |

*Primary Examiner*—Frank L. Abbott
*Assistant Examiner*—James L. Ridgill, Jr.
*Attorneys*—Walter J. Jason, Donald L. Royer and Robert O. Richardson

ABSTRACT: Perforated blankets of fiberglass material are fitted on each side of a double-dimpled core material having perforations therethrough. A backing sheet and face sheet of panel material is bonded to the outer surfaces of the dimples. Sound passing through the face sheet material enters the panel and is dissipated in the fiberglass material in the core. The panel has no resonant frequency and has a high coefficient of absorption over a broad band of frequencies in the speech frequency range.

Patented Aug. 10, 1971 3,597,891
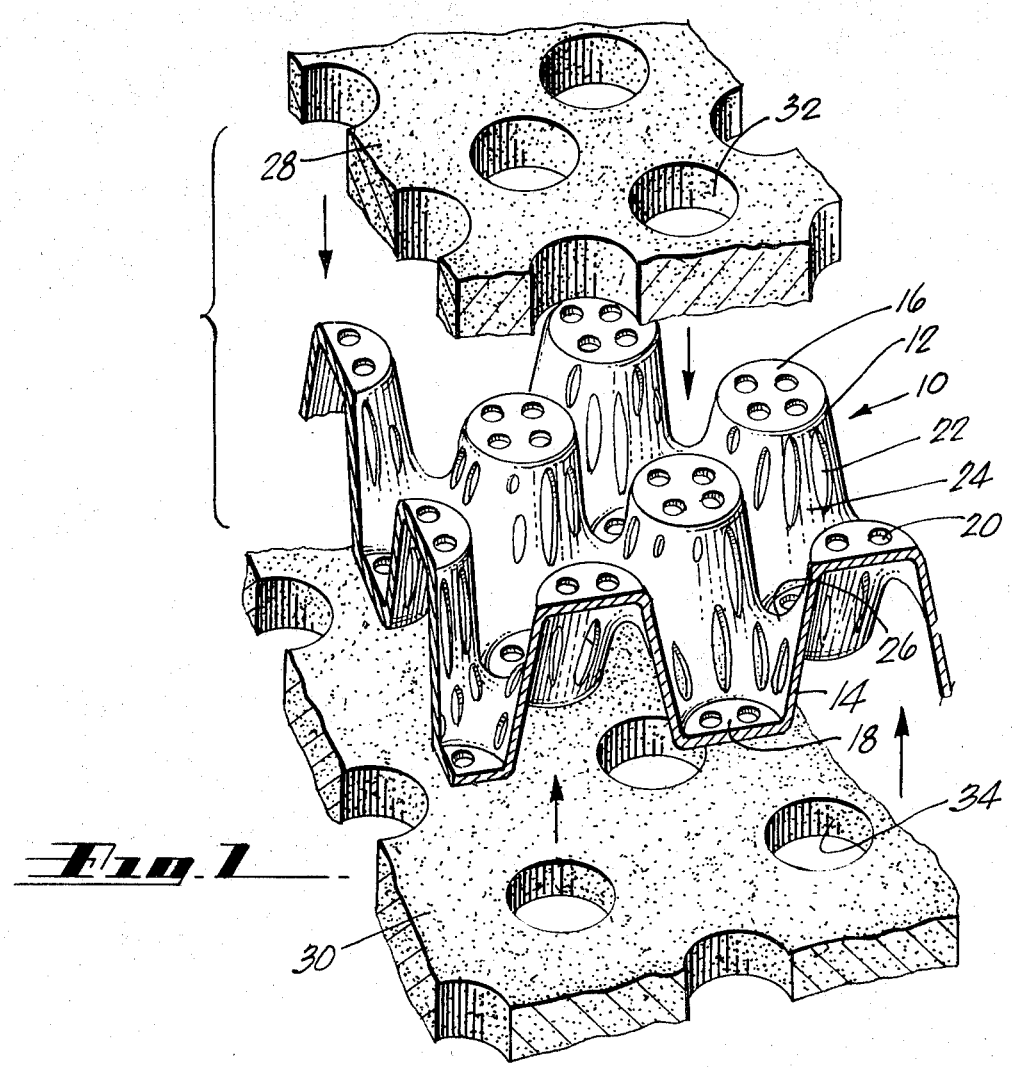
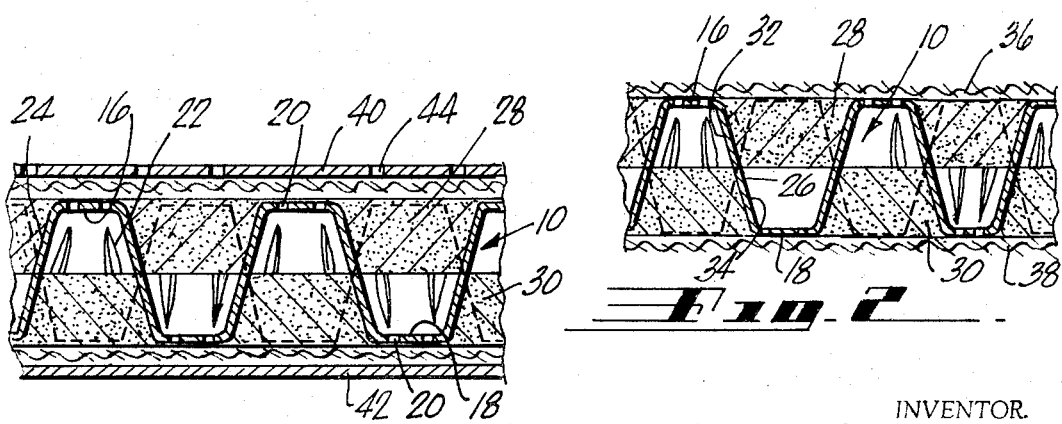
INVENTOR.
FLYODD A. MARTIN
BY Robert O.
Richardson
ATTORNEY

INTERIOR ABSORPTIVE PANEL

BACKGROUND OF THE PRESENT INVENTION

Strong, lightweight panels are used in walls, floor or ceiling structures in buildings and vehicles, such as airplanes, trucks, trailers, and the like, where the strong lightweight member is desired. One form of panel comprises an inner membrane having protruding nodes on each side of its planar surface to space and support cover sheets bonded thereto. This provides a sandwich having this inner core material between the two outer layers. While there are many such structures shown in the prior art, one such example is shown in the patent to Scurlock for a Panel Structure, U.S. Pat. No. 2,481,046 which issued 6 Sept. 1949. With the exception of a dead air space between the cover sheets, the panels have no sound attenuation qualities and sound was readily transmitted from one face sheet through the inner core structure to the other face sheet.

BRIEF SUMMARY OF PRESENT INVENTION

A double-dimple core is formed in the manner similar to prior art methods except that the sheet of core material has a plurality of small apertures therein and, when the forming process has been accomplished, these apertures remain unchanged on the nodes but are elongated in the truncated conical walls interconnecting the opposing nodes. Having thus modified the prior art double dimpled core, layers of fiberglass batting with apertures therein are then placed over the nodes and into the air spaces between the nodes. These spaces form cavities when opposed panel sheets have been glued to the nodes. A face sheet having apertures therein faces the direction of noise to be attenuated, on installation of the panel. An open weave fiberglass flyscreen may be affixed to the nodes after the fiberglass batting has been placed thereover to provide a unitary core structure for convenient storage and shipping without the outer sheets affixed thereto.

BRIEF DESCRIPTION OF THE DRAWINGS

FIG. 1 is an exploded perspective view of the inner core material sandwiched between layers of fiberglass batting;
FIG. 2 is a sectional view of the inner core composite; and
FIG. 3 is a sectional view of a completed absorptive panel.

DETAILED DESCRIPTION OF ILLUSTRATIVE EMBODIMENT

Referring now to the drawings there is shown in FIG. 1 a core sheet 10 which has been formed from a single flat sheet and which has upwardly extending indentations 12 and opposite or downwardly extending indentations 14. These indentations may be formed by striking, stamping or indenting. One such method is to heat the sheet 10, if it is of a thermoplastic material, and then effecting such indentations by applying pressure between oppositely directed parallel pins. This may be done with a press such as disclosed in the U.S. Pat. No. 3,227,598 to Robb on 4 Jan. 1966 for Core Structure. Indentations using a roller technique is set forth in U.S. Pat. No. 2,441,476 to Ewald for Reinforced Structural Sheet on 11 May 1948. These indentations 12 and 14 terminate in nodes 16 and 18 having a flat surface of a configuration similar to the forming surface of the pins or protrusions of the device used in forming the indentations.

Before the indentation operation has been made, sheet 10 has a plurality of apertures 20 cut therein. These openings comprise from five to 20 percent of the total area of the sheet before indentation. These apertures 20 within the area of the nodes 16 and 18, retain their original configuration, whereas the apertures 22 within the truncated conical wall 24 interconnecting the nodes 16, 18 deform with the material and become elongated. The apertures 20 assist in bonding the outer backing and face sheets to the nodes 16 and 18 as will be described hereinafter, and the elongated apertures 22 have an acoustical purpose, as will be set forth hereinafter, also.

The walls adjacent indentations 12 (and 14) extending in the same direction meet in a saddle 26 which is in the plane of the original sheet before it was dimpled. This is also a midpoint between the upwardly extending indentations 12 and the downwardly extending indentations 14. This distance between saddle 26 and the surface of the nodes determine the thickness of the fiberglass batting 28 and 30 which is then applied to each side of the sheet 10. Batting 28 and 30 have a plurality of apertures defined by aperture walls 32 and 34 adapted to fit over indentations 12 and 14 of core 10 so that the surfaces of nodes 16 and 18 remain the outermost surfaces of the combination for attachment with cover and backing sheets. FIG. 2 is an elevational view showing the batting 28 and 30 positioned over the core 10 with nodes 16 and 18 extending through aperture walls 32, 34 of the batting. As can be seen, the thickness of the batting is substantially the same as the distance from saddle 26 to the nodes 16 and 18. In order to maintain the batting and the core in this position, an open weave fiberglass flyscreen 36 and 38 is applied over the batting and in contact with the nodes 16 and 18. This flyscreen may be tacked, glued or bonded in any appropriate manner to these nodes to thus form an integral inner core structure. Because the flyscreen is open face, it does not interfere with the subsequent bonding of the outer back and face sheets.

In FIG. 3 face sheet 40 and back sheet 42 are shown affixed to nodes 16 and 18. Panel 40 is intended to face a noise source and has a plurality of apertures 44 therein. These apertures prevent panel 40 from having a sound amplifying effect similar to that of a drum head in the absence of openings therein. Sound waves thus may pass through these apertures 44 and into the fiberglass batting 28 on the noise side of the dimpled core 10. The apertures 22 in the walls of the indentation permit sound wave passage therethrough and into the batting 30 where further sound absorption occurs.

It is to be understood that the area of the elongated apertures 22, the area of the core wall material 24, the core thickness between nodes 16 and 18, their offset spacing and the configuration of the nodes themselves, all contribute to a strength-to-weight relationship and a strength-to-noise-abatement relationship, and that these parameters may be varied according to the use of the panel and the characteristics desired. In one form the core material was a thermoplastic material called polysulfone, an opaque creme-colored plastic in its natural form. It has high temperature resistance and low smoke characteristics, making it a desirable core for interior aircraft panels. In this application the high frequency components of noise was absorbed in the light, loosely filled front cavity of the core. Whereas normally the lower frequency components were allowed to pass through the core perforations and were absorbed by the more dense closely packed fiberglass in the back cavity, in this particular application sufficient noise attenuation was accomplished without perforating the core and using the back cavity fiberglass.

I claim:

1. A panel having a high coefficient of absorption over a broad band of frequencies comprising:
    an inner double-dimple core having alternate upwardly and downwardly extending indentations terminating in nodes on both sides with truncated conical walls interconnecting opposing nodes,
    elongated apertures in said truncated conical walls,
    said core defining a plane between said nodes, said nodes having flat surfaces with apertures therein,
    said walls extending in the same direction forming a saddle in said plane,
    a first layer of acoustic material having apertures therein and of a thickness substantially equal to the space between said saddle and said nodes, said layer being positioned over said core with apertures in said layer being adapted to fit over said indentations and thereby exposing said nodes,
    a second layer of acoustic material similar to said first layer and applied to the other side of said core, said indentations defining unfilled cavities within said truncated walls between said nodes and said core plane.

2. A panel as set forth in claim 1 wherein said first layer loosely fills space between said saddle and said nodes for absorbing high frequency components of noise in the speech frequency range, and said second layer is more dense closely packed to absorb the lower frequency components of noise in the speech frequency range.

3. A panel as set forth in claim 1, and an open weave material affixed to said nodes to retain said layers thereover.